UNITED STATES PATENT OFFICE.

FREDERICK LAIST, OF ANACONDA, MONTANA, ASSIGNOR TO ANACONDA COPPER MINING COMPANY, OF ANACONDA, MONTANA, A CORPORATION OF MONTANA.

PROCESS OF TREATING ZINC ORES.

1,255,438. Specification of Letters Patent. Patented Feb. 5, 1918.

No Drawing. Application filed July 10, 1916. Serial No. 108,461.

*To all whom it may concern:*

Be it known that I, FREDERICK LAIST, a citizen of the United States, residing at Anaconda, in the county of Deerlodge and State of Montana, have invented certain new and useful Improvements in Processes of Treating Zinc Ores, of which the following is a specification.

This invention is a process whereby iron-free solutions are obtained from zinc ores with a minimum consumption of the solvent acid, usually sulfuric acid.

It is the present practice in extracting zinc from blende, for example, to calcine the ore at high temperatures, and to leach the calcine with dilute sulfuric acid. Some excess of acid is used in order to secure substantially complete extraction of the zinc, with the result that the solutions obtained contain iron, which is precipitated in the ferric state by neutralizing the excess acid by means of calcine, with or without the final addition of a little limestone, the solution being subjected to oxidation at some stage of the operation to convert all of the iron into the ferric state. Under these conditions, arsenic is precipitated in combination with the iron. The solution is now filtered, the filtrate being subjected to further purifying operations and ultimately to a zinc-recovery process, while the ferric precipitate, which in addition to its arsenic content contains considerable sulfate of zinc, is returned to the ore-calcining furnaces for the purpose of rendering the iron insoluble. At the high operating temperature of these furnaces, the bulk of the zinc sulfate is of course decomposed, the equivalent quantity of sulfuric acid being therefore lost. This loss is a material one, being practically all of the excess acid used in the leach and thereafter neutralized by the calcine, as well as the acid which was initially spent for dissolving iron.

I have found that the above mentioned loss of acid may be largely or entirely avoided, while at the same time effecting a separation of the iron, by modifying the above-described process as follows:—

The ore is calcined and leached as usual, the calcination taking place at high temperatures and the requisite excess of the acid solvent being employed for leaching. After separating the residue from the solvent by filtration or otherwise, the solution is neutralized by calcine or other material containing zinc oxid, some excess of calcine being used. The resulting iron-free solution is filtered off, leaving a residue consisting essentially of the ferric precipitate, associated with arsenic and zinc sulfate and the excess of calcine.

This residue is now roasted in any suitable furnace operating at a controlled temperature materially below that of the regular calcining furnaces, the furnacing conditions, including the temperature and time of heating, being regulated with a view to rendering the iron insoluble in dilute acids while avoiding any material decomposition of zinc sulfate. For this purpose the temperature should not exceed 625° C. The product from this furnace is preferably added to the calcine from the regular roasting furnaces, and passes with the calcine through the leaching step, whereby its zinc content is recovered.

By conducting the operation in this manner the losses of sulfuric acid are greatly reduced or practically avoided.

I claim:—

1. The process of treating zinc ores containing iron, which consists in calcining the ore, leaching the calcine with a solution containing sulfuric acid, precipitating the iron from the resulting solution by a material containing zinc oxid, separating the precipitate from the iron-free solution, furnacing said precipitate at a temperature materially below that of the calcination, said temperature sufficient to render the ferric compounds insoluble while avoiding substantial decomposition of zinc sulfate, and extracting the zinc sulfate from the furnaced product.

2. In a process of treating calcined zinc ores, the steps which consist in precipitating iron from impure zinc sulfate solutions by a material containing zinc oxid, furnacing the precipitate at a temperature below that of the calcination and below the decomposition point of zinc sulfate, and extracting the zinc sulfate from the furnaced product.

In testimony whereof I affix my signature in presence of two witnesses.

FREDERICK LAIST.

Witnesses:
  ALBERT E. WIGGIN,
  JAMES McPHERSON.